(12) United States Patent
Akaishi (10) Patent No.: US 11,637,486 B2
(45) Date of Patent: Apr. 25, 2023

(54) ROTOR MANUFACTURING DEVICE

(71) Applicant: TOYOTA JIDOSHA KABUSHIKI KAISHA, Toyota (JP)

(72) Inventor: Masayuki Akaishi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/661,825

(22) Filed: May 3, 2022

(65) Prior Publication Data

US 2022/0385153 A1  Dec. 1, 2022

(30) Foreign Application Priority Data

May 25, 2021  (JP) .............................. JP2021-087548

(51) Int. Cl.
*H02K 15/03* (2006.01)

(52) U.S. Cl.
CPC .......... *H02K 15/03* (2013.01); *Y10T 29/5313* (2015.01); *Y10T 29/53143* (2015.01)

(58) Field of Classification Search
CPC ...... H02K 15/03; H02K 1/2706; H02K 1/276; Y10T 29/49826; Y10T 29/49012; Y10T 29/5313; F05B 2220/7068; F16C 2380/26; F16C 39/063

USPC .......... 29/598, 596, 604, 607, 729, 732, 738
See application file for complete search history.

(56) References Cited

U.S. PATENT DOCUMENTS

| | | | |
|---|---|---|---|
| 10,326,342 B2 * | 6/2019 | Kino .................... | H02K 1/2706 |
| 2013/0032090 A1 | 2/2013 | Yano | |
| 2016/0072370 A1 | 3/2016 | Hasegawa et al. | |
| 2017/0040875 A1 | 2/2017 | Kino et al. | |

FOREIGN PATENT DOCUMENTS

| | | |
|---|---|---|
| JP | 9-163649 A | 6/1997 |
| JP | 2013-31805 A | 2/2013 |
| JP | 5983869 B2 | 9/2016 |
| JP | 2017-38459 A | 2/2017 |

\* cited by examiner

*Primary Examiner* — Thiem D Phan
(74) *Attorney, Agent, or Firm* — Oblon, McClelland, Maier & Neustadt, L.L.P.

(57) ABSTRACT

A guide device which is a rotor manufacturing device includes a pair of sheet guides and a holder. The holder is disposed between the pair of sheet guides and includes a magnet outlet through which a permanent magnet is inserted into the slot from above. The pair of sheet guides is linearly symmetrical in a front view in which a side of the pair of sheet guides is located at the front. The axis of symmetry of the pair of sheet guides and the center axis of the magnet outlet are aligned with each other in the front view.

3 Claims, 8 Drawing Sheets

ROTOR MANUFACTURING DEVICE

CROSS REFERENCE TO RELATED APPLICATION

This application claims priority to Japanese Patent Application No. 2021-087548 filed on May 25, 2021, which is incorporated herein by reference in its entirety including the specification, claims, drawings, and abstract.

TECHNICAL FIELD

The present disclosure relates to a device used to manufacture a rotor of a rotating electrical machine.

BACKGROUND

Rotating electrical machines of permanent magnet types include permanent magnets in rotor cores. For example, a rotating electrical machine of an interior permanent magnet (1PM) type includes through holes called "slots" extending along the shaft of the rotor core, and permanent magnets are inserted in respective slots.

For example, in JP 2017-38459 A and JP 5,983,869 B, a guide device which includes a guide hole is used as a device (tool) to insert a permanent magnet into each slot. To insert the permanent magnet, the guide hole is aligned with a slot. The guide hole is widened toward the top (tapered downward). The permanent magnet is aligned with the guide hole by proceeding in contact with the tapered face at the widened upper end. The aligned permanent magnet is then inserted further into the guide hole and the slot below.

The permanent magnet is fixed to the rotor core after being inserted into the slot. For example, in JP 2013-31805 A, permanent magnets are fixed to a rotor core with an adhesive resin filled between the permanent magnet and internal faces of each slot.

In JP H09-163649 A, instead of an adhesive resin, sheets containing adhesive agent are inserted between a permanent magnet and internal faces of each slot. This publication describes that the slots are, as an example, an elongated hole and have a pair of opposing internal faces. A pair of sheets are disposed along the pair of internal faces. The permanent magnet is inserted between the pair of sheets. The permanent magnet is then fixed to the rotor core via the sheets by heat curing the sheets.

When inserting the sheets and the permanent magnets into the slots, it can be impractical to attempt to insert the sheets after the permanent magnet has been inserted because each of the sheets, which are flexible, must be inserted into a narrow gap between the already inserted permanent magnet and the internal face of the slot. It is therefore more practical to insert the sheets into the slot prior to inserting the permanent magnet. However, if this insertion process is performed using a guide device, the sheets should be inserted into the guide hole of the guide device, and then into the slot of the rotor core prior to the insertion of the permanent magnet into the guide hole and the slot.

As described above, when the permanent magnet is inserted into the guide hole, the permanent magnet is aligned with the center axis of the guide hole while the bottom end of the permanent magnet proceeds in contact with the tapered face at the upper end of the guide hole. This process creates a risk of the bottom end of the permanent magnet tearing or damaging the sheet placed on the tapered face prior to the insertion of the permanent magnet.

The present disclosure provides a rotor manufacturing device which can appropriately insert sheets such as adhesive sheets and permanent magnets into slots of a rotor core without damaging the sheets.

SUMMARY

In a rotor manufacturing device according to an embodiment of the present disclosure, sheets and permanent magnets are inserted into slots extending along the rotational axis of a rotor core. Each slot is an elongated hole and has a pair of opposing faces opposing each other. In an insertion process, the sheets and the permanent magnet are inserted into each slot with the rotor core positioned such that the rotational axis of the rotor core is vertically oriented. The rotor manufacturing device includes a pair of sheet guides opposing each other and a holder. Each of the sheet guides is disposed above a corresponding one of the pair of internal faces of the slot to feed the sheet into the slot. The holder is disposed between the pair of sheet guides, and includes a magnet outlet through which the permanent magnet is fed into the slot from above. The pair of sheet guides is linearly symmetrical in a front view in which a side of the pair of sheet guides is located at the front. The axis of symmetry of the pair of sheet guides and the center axis of the magnet outlet are aligned with each other in the front view.

With the above structure, damage to the sheets by the permanent magnet while being guided can be prevented because the sheet insertion means (sheet guides) and the magnet insertion means (holder) are separately provided in the rotor manufacturing device. Furthermore, by using the above structure in which the axis of symmetry of the pair of sheet guides and the center axis of the magnet outlet are aligned with each other in the front view, the sheets and the permanent magnet can be appropriately inserted into the slot merely by aligning, for example, the center axis of the magnet outlet with the center axis of the slot.

In the above structure, a pair of retaining plates may be provided, at the magnet outlet, to pinch the permanent magnet in place against the weight of the permanent magnet. The retaining plates may bend away from the axis of symmetry while the permanent magnet is inserted into the slot. The spring constants of the retaining plates may be equal to each other.

When the permanent magnet is pressed downward against the pinching force of the retaining plates, the retaining plates bend outwards, that is, away from the axis of symmetry while the permanent magnet is fed, and an elastic force (restoring force) acts against this bending. Because the spring constants of the retaining plates are equal to each other, the permanent magnet can be inserted into the slot while being aligned with the axis of symmetry (centered) by the pair of retaining plates.

In the above structure, the holder may include a pressing device. The pressing device may press the permanent magnet downward against the pinching force of the pair of retaining plates after the sheets are inserted into the slot.

In the above structure, the permanent magnet can be inserted into the slot after the insertion of the sheets into the slot has been completed.

The rotor manufacturing device according to an embodiment of the present disclosure enables appropriate insertion of the sheets and the permanent magnet into each slot of the rotor core while preventing damage to the sheets.

BRIEF DESCRIPTION OF DRAWINGS

Embodiments of the present disclosure will be described based on the following figures, wherein.

DESCRIPTION OF EMBODIMENTS

Figure 1:
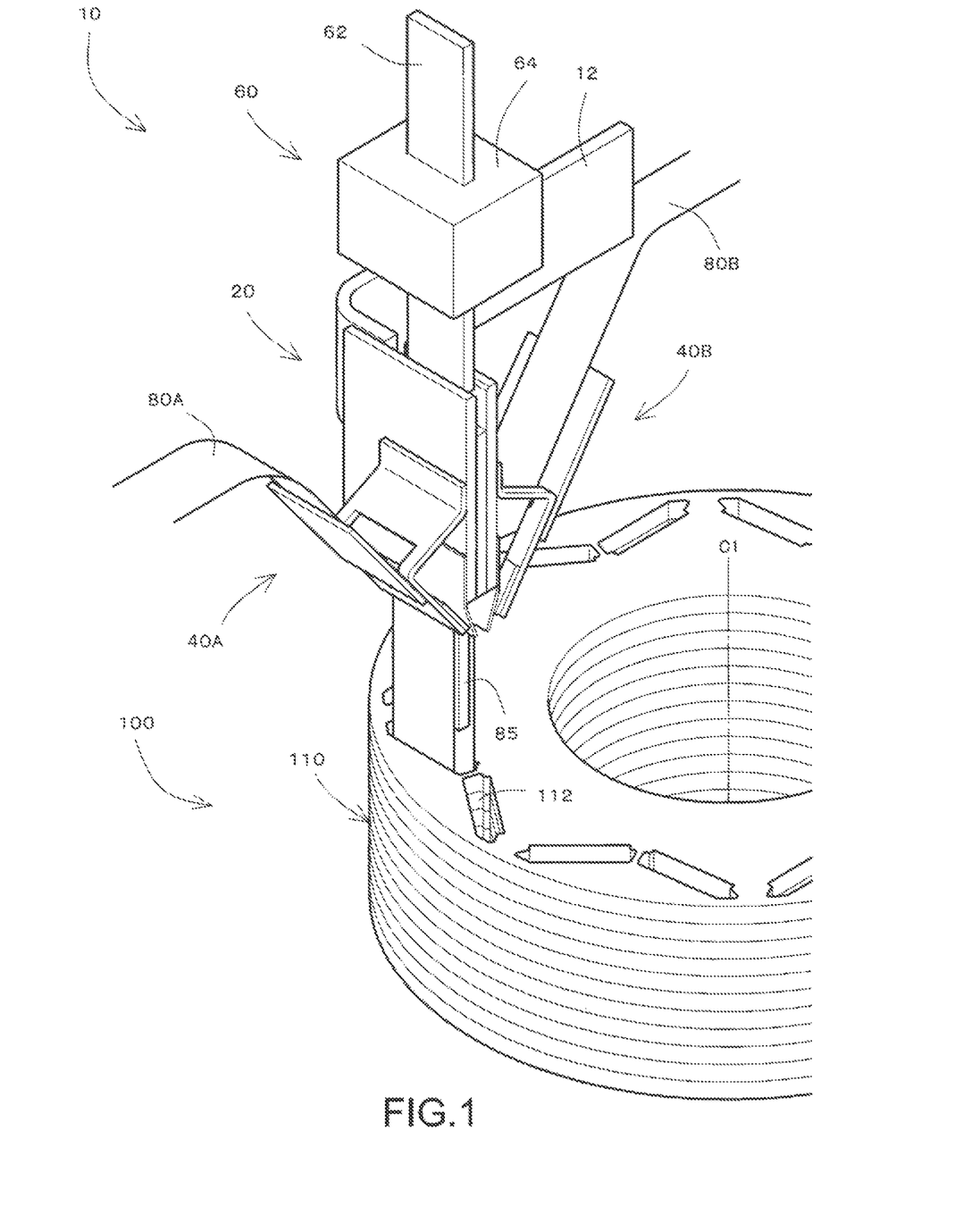
FIG. 1 is perspective view showing an insertion process of sheets and a permanent magnet into a rotor core using a guide device which is a rotor manufacturing device according to an embodiment of the present disclosure.

FIG. 1 shows an example of a rotor 100 of a rotating electrical machine and a guide device 10 which is used to assemble the rotor 100. The guide device 10 is a rotor manufacturing device according to an embodiment of the present disclosure. The rotating electrical machine is used as a drive source of, for example, a battery electric vehicle (BEV) or a hybrid electric vehicle (HEV).

Rotor Structure

The rotor 100 includes a rotor core 110, permanent magnets 85, and sheets 80A, 80B. The rotor core 110 is cylindrical in shape. A shaft (not shown) is inserted into the center hole. The rotor core 110 may comprise a stack of electromagnetic steel laminations.

The rotating electrical machine may be of, for example, an interior permanent magnet (IPM) type, in which the permanent magnets 85 are embedded in the rotor core 110. The rotor core 110 includes multiple slots 112, each of which extends along the rotational (central) axis C1. A permanent magnet 85 is inserted into each slot 112. The multiple slots 112 are arranged along the circumference of the rotor core 110.

Figure 2:
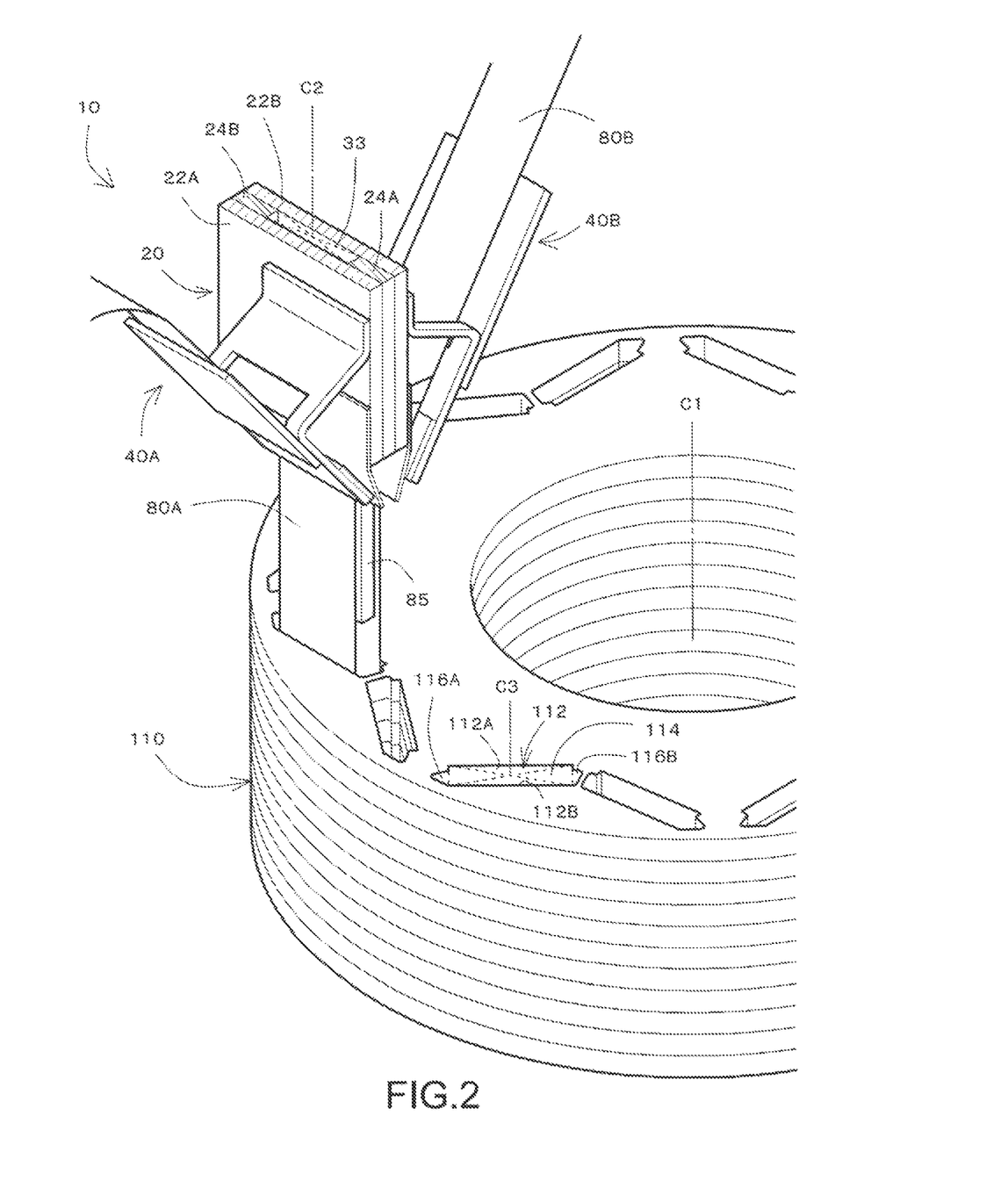
FIG. 2 is a perspective view to be used to describe the center axis C2 of a magnet guide hole and the center axis C3 of a slot.

Each slot 112 may be an elongated hole and have the short sides of the rectangular shape disposed substantially in a radial direction of the rotor core 110, whereas the long sides are disposed in a direction substantially along the circumference. More specifically, as shown in FIG. 2, each slot 112 includes a rectangular portion 114 which is a rectangular opening with the longitudinal axis disposed in a direction substantially along the circumference, and projecting grooves 116A, 116B projecting from respective ends of the rectangular portion 114.

As described below, when aligning the guide device 10 to the slot 112, the center axis C2 of the guide device 10 is aligned with the center axis C3 of the slot 112. The center axis C3 of the slot 112 is an axis which runs through the intersection between the diagonals of the rectangular portion 114 and extends along the rotational axis C1 of the rotor core 110. As also described below, the center axis C2 of the guide device 10 is an axis which runs through the intersection between the diagonals of a magnet guide hole 33 which is an opening having a rectangular cross section and extends along the extending axis of the magnet guide hole 33.

The slot 112 of an elongated hole includes opposing internal faces 112A, 112B along the longitudinal axis. A pair of sheets 80A, 80B are fed along the internal faces 112A, 112B to be inserted into the slot 112.

The sheets 80A, 80B are made from an insulation material. The sheets 80A, 80B may be, for example, wound rolls, and fed to the sheet guides 40A, 40B by a motor or other means (not shown).

The sheets 80A, 80B have the same width as the internal faces 112A, 112B. A direct contact and electrical conductivity between the permanent magnet 85 and the rotor core 110 are prevented by the sheets 80A, 80B sandwiched therebetween. Because the permanent magnet 85 and the rotor core 110 are not in contact with each other, eddy currents induced by the permanent magnet 85 are prevented from flowing into the rotor core 110.

In addition to the insulation function to insulate between the permanent magnet 85 and the rotor core 110, the sheets 80A, 80B also have an adhesive function to fix the permanent magnet 85 to the rotor core 110 and a cooling function to cool the permanent magnet 85.

The sheets 80A, 80B may be made of a foam material. The rotor core 110 with the permanent magnet 85 and the sheets 80A, 80B inserted therein may be heated, for example, in a heating furnace. In such a heating process, the sheets 80A, 80B may foam and expand. The permanent magnets 85 are fixed to the rotor core 110 utilizing the expansion of the sheets 80A, 80B.

Further, channels form in the sheets 80A, 80B where generated bubbles connect with each other. The permanent magnets 85 are cooled by air or coolant flowing through these channels.

With reference to FIG. 1, the permanent magnet 85 may be made of a rare earth magnet, such as neodymium. The permanent magnet 85 may have a flat bar shape and be sized slightly smaller than the slot 112 to create a gap between the permanent magnet 85 and the slot 112 so as to allow the insertion of the sheets 80A, 80B.

Guide Device Structure

Figure 3:
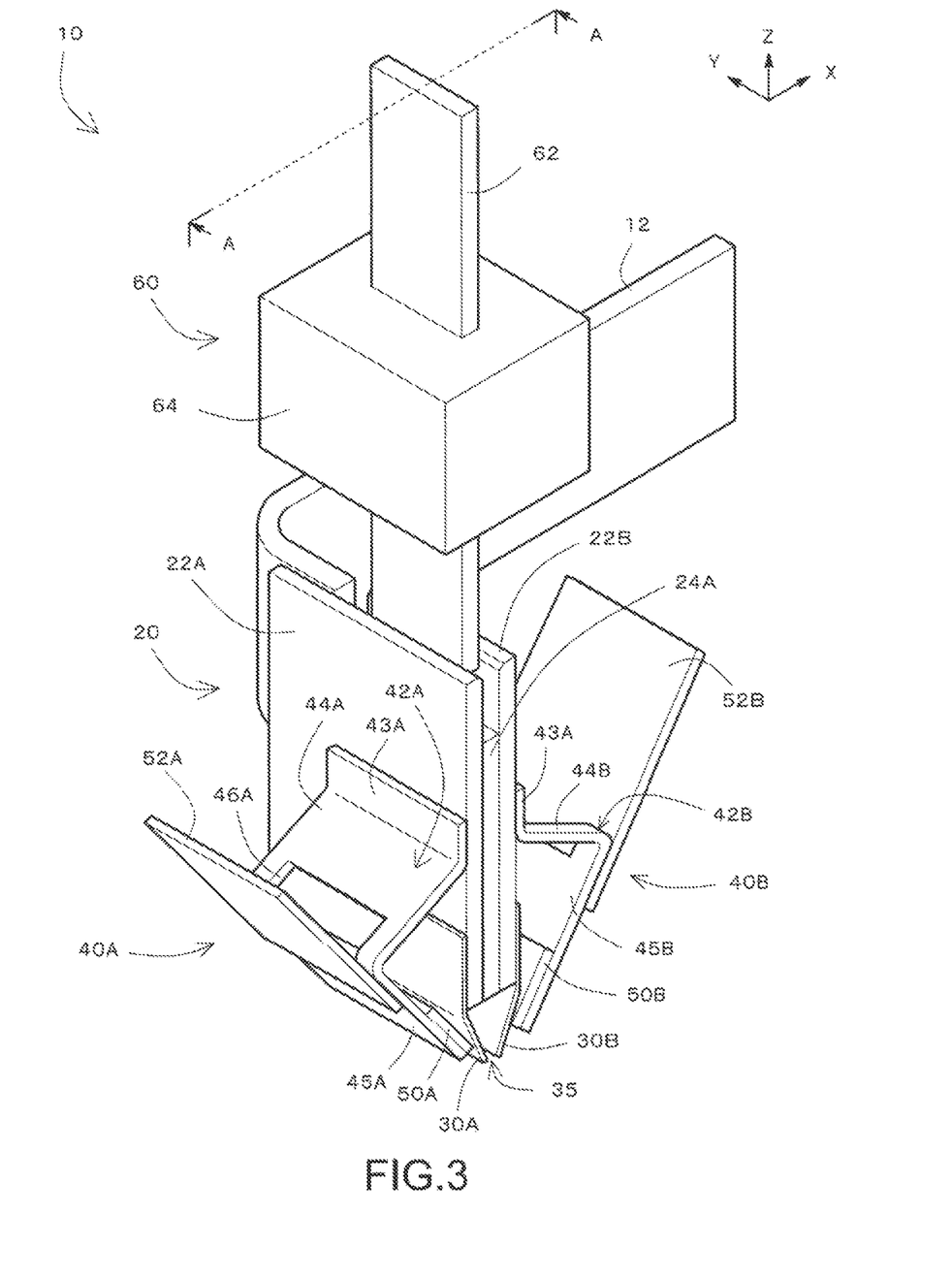
FIG. 3 is a perspective view of the guide device according to an embodiment of the present disclosure.
Figure 4:
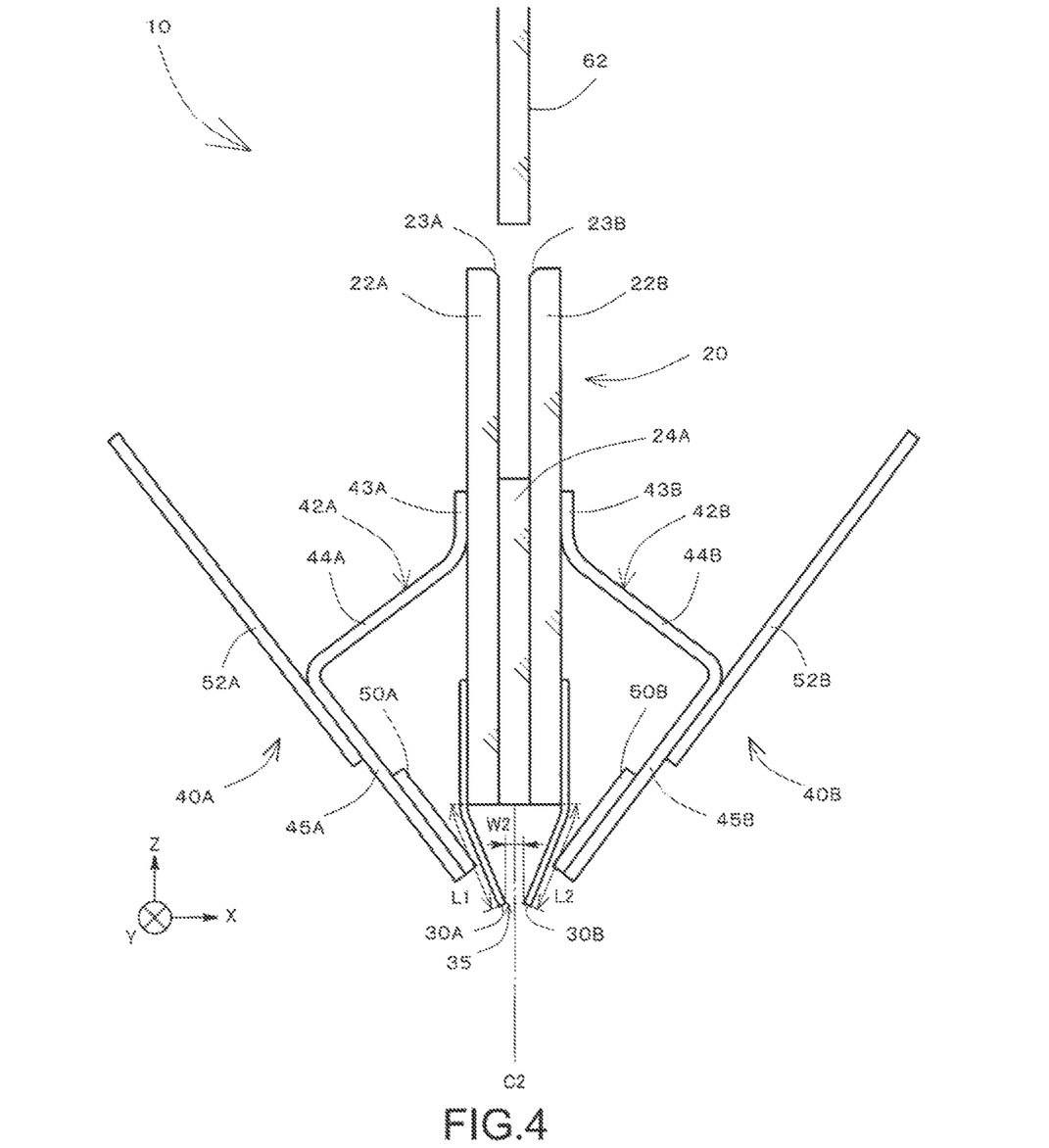
FIG. 4 is a front view of the guide device according to the embodiment of the present disclosure.
Figure 5:
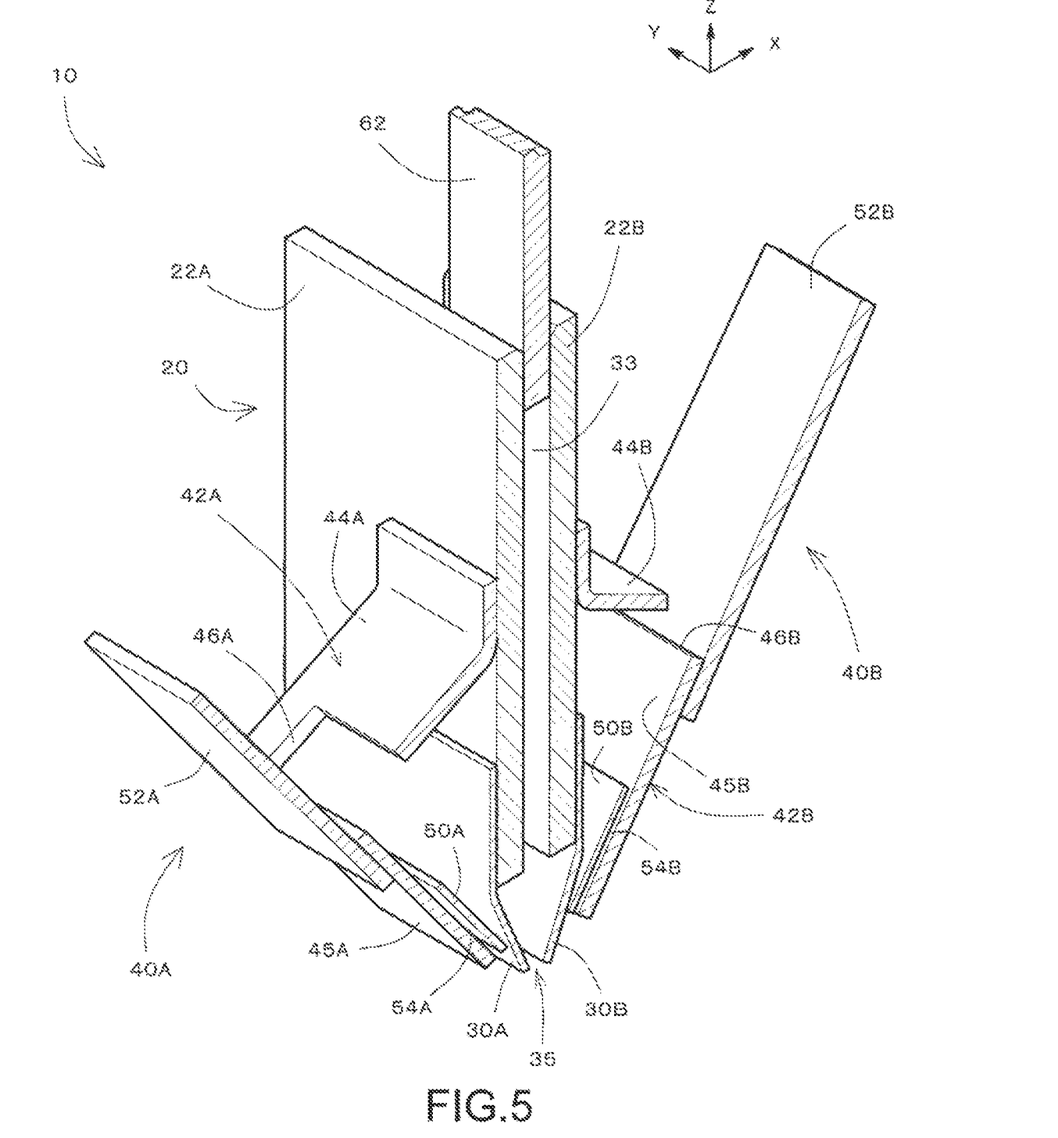
FIG. 5 is a perspective cross sectional view of the guide device according to the embodiment of the present disclosure, taken along line A-A in FIG. 3.
Figure 6:
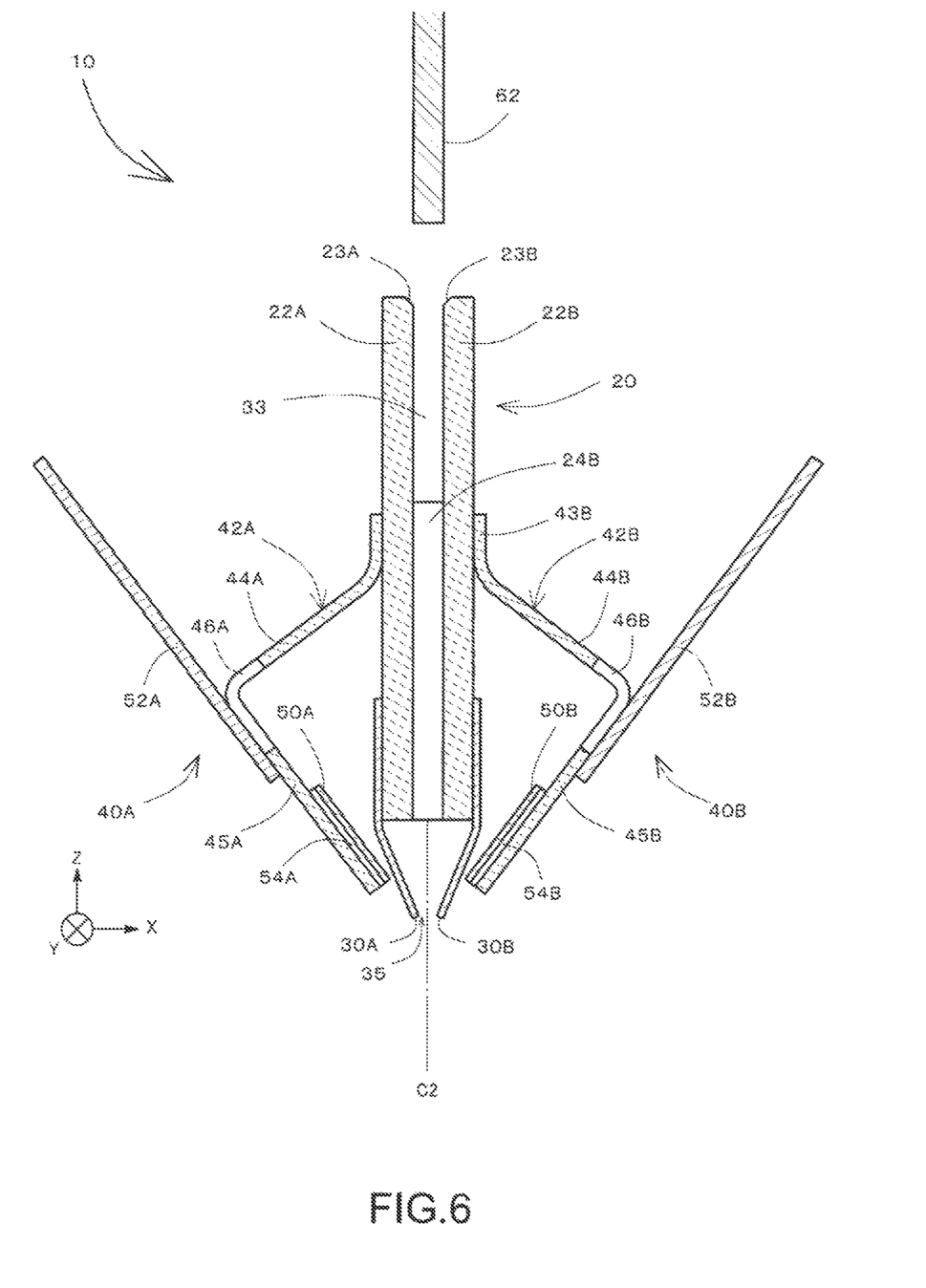
FIG. 6 is a front cross sectional view of the guide device according to the embodiment of the present disclosure, taken along line A-A in FIG. 3.

The guide device 10 (rotor manufacturing device) is a jig (supplementary tool) to insert the pair of sheets 80A, 80B and the permanent magnet 85 into each slot 112. FIG. 3 shows an exemplary perspective view of the guide device 10 according to an embodiment of the present application. FIG. 4 shows an exemplary front view (viewed from a point on the y-axis) of the guide device 10. FIG. 5 shows an exemplary perspective cross sectional view taken along line A-A in FIG. 3. FIG. 6 shows an exemplary A-A cross section (front cross sectional view).

FIGS. 3 to 6 show axes X, Y, and Z which are perpendicular to each other. The z-axis represents a longitudinal axis of the guide device 10 in parallel to the center axis C2 of the guide device 10. The positive side of the z-axis is directed upward, whereas the negative side is directed downward.

The y-axis is the axis through which the front view is viewed with a side of the pair of sheet guides 40A, 40B located at the front. The y-axis is in parallel to, for example, the width axis of holder plates 22A, 22B. The x-axis is perpendicular to the y-axis and the z-axis. The x-axis is in parallel to, for example, the thickness axis of the holder plates 22A, 22B.

The guide device 10 includes the pair of sheet guides 40A, 40B which guide the sheets 80A, 80B into each slot 112. The guide device 10 also includes a holder 20 which feeds the permanent magnet 85 into the slot 112. In other words, the guide device 10 includes a feeding means to feed the sheets 80A, 80B and another feeding means to feed the permanent magnet 85.

The guide device 10 further includes an arm 12 (refer to FIG. 3) which supports the sheet guides 40A, 40B and the holder 20. The arm 12 is connected to a driving mechanism, such as a three-axis stage or an actuator (not shown). This enables three-dimensional movement of the guide device 10 relative to the rotor core 110.

The sheet guides 40A, 40B are linearly symmetrical in the front view (y-axis view), with an axis of symmetry aligned at least in the front view with the center axis C2 of the magnet guide hole 33 and a magnet outlet 35 (refer to FIG. 6). Here, even when the axis of symmetry and the center axis C2 are slightly misaligned, the two axes are considered to be substantially aligned as long as the difference is within a specified tolerance.

Although the structure of the sheet guide 40A is described below, because the sheet guide 40B is symmetric to the sheet guide 40A, the structure description of the sheet guide 40A can also be applied to that of the sheet guide 40B by replacing "A" with "B" in the reference numerals referenced below.

With reference to FIG. 3, the sheet guide 40A includes a guide arm 42A, a guide plate 52A, and a sheet protection plate 50A. The guide arm 42A is substantially L-shaped in the front view (y-axis view). A flange 43A extends from the top edge of the guide arm 42A. The flange 43A is fixed to the holder plate 22A with bolts and nuts or by welding.

An arm upper portion 44A extends from the bottom edge of the flange 43A such that the arm upper portion 44A is tilted with respect to the flange 43A. The arm upper portion 44A extends diagonally outwards, for example, from the upper edge toward the lower edge to be away from the center axis C2. An arm lower portion 45A extends from the bottom edge of the arm upper portion 44A. The arm lower portion 45A extends diagonally inwards from the upper edge toward the lower edge to be closer to the center axis C2.

Figure 7:
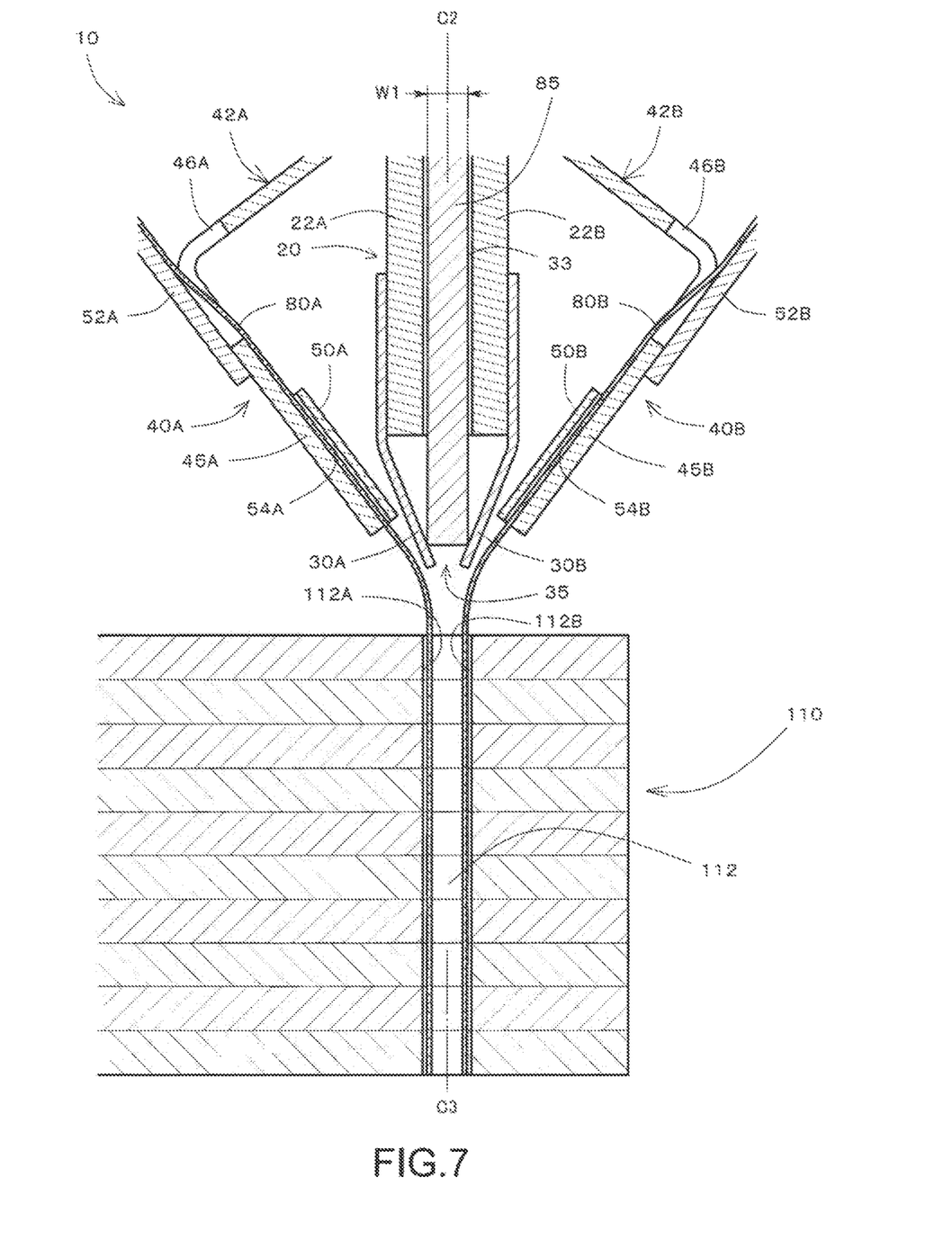
FIG. 7 is a front cross sectional view to be used to describe an insertion process of the sheets and the permanent magnet into the rotor core using the guide device (1/2)

With reference to FIGS. 3 and 5, a sheet gate 46A is an opening at the lateral center of a lower end of the arm upper portion 44A. As shown in FIG. 7 described below, the sheet 80A is fed into the sheet gate 46A.

The guide plate 52A is disposed close to the corner between the arm upper portion 44A and the arm lower portion 45A. In the feeding direction of the sheet 80A, the downstream end of the guide plate 52A is bolted or welded to the guide arm 42A.

The sheet protection plate 50A is disposed at the lower end of the arm lower portion 45A. The sheet protection plate 50A may be fixed to, for example, the upper face of the arm lower portion 45A. The sheet protection plate 50A may be fixed to the arm lower portion 45A by bolting or welding along both lateral (y-axis) sides of the sheet protection plate 50A.

In the example shown in FIGS. 5 and 6, the lateral center portion of the sheet protection plate 50A is thinner than both sides. A gap therefore exists between the upward face of the arm lower portion 45A and the downward face of the sheet protection plate 50A. This gap acts as a sheet guide opening 54A.

In the example shown in FIG. 7, the sheet 80A is fed into the slot 112 of the rotor core 110 via the guide plate 52A, the arm lower portion 45A, and the sheet guide opening 54A.

Contact between the sheet 80A and a retaining plate 30A disposed above the sheet protection plate 50A can be prevented by providing the sheet guide opening 54A at the downstream end of the sheet guide 40A and covering the sheet guide opening 54A with the sheet protection plate 50A. As described below, the retaining plate 30A bends outward to be away from the center axis C2 when the permanent magnet 85 is inserted into the slot 112. Because the sheet protection plate 50A can block the retaining plate 30A, contact between the retaining plate 30A and the sheet 80A can be prevented even when the amount of bending is large.

As shown in FIG. 1, the holder 20 temporarily holds the permanent magnet 85 and feeds the permanent magnet 85 into the slot 112 from above. The holder 20 is disposed between a pair of sheet guides 40A, 40B. As shown in FIGS. 2 and 3, the holder 20 includes holder plates 22A, 22B, spacers 24A, 24B (refer to FIG. 2), the retaining plates 30A, 30B, and a pressing device 60 (refer to FIG. 1).

As shown in FIGS. 2 and 4, the holder plates 22A, 22B are flat boards and spaced apart from each other along the thickness (along the x-axis) with the spacers 24A, 24B disposed therebetween. The spacers 24A, 24B are disposed on respective sides of the holder plates 22A, 22B.

An opening of a rectangular cross section is defined by the holder plates 22A, 22B and the spacers 24A, 24B. This opening acts as the magnet guide hole 33. The magnet guide hole 33 may have a cross section that matches that of the rectangular portion 114 of the slot 112, or may have slightly smaller dimensions. For example, the magnet guide hole 33 may have a cross section smaller than the rectangular portion 114 such that each edge of the cross section of the magnet guide hole 33 is shifted inward, for example, by 0.5 mm from the opposing edge of the rectangular portion 114.

The center axis C2 of the magnet guide hole 33 runs through the intersection between the diagonals of the rectangular cross section of the magnet guide hole 33 and extends along the extending axis of the magnet guide hole 33. The center axis C2 is aligned with the axis of symmetry of the pair of sheet guides 40A, 40B in the front view (y-axis view).

As shown in FIG. 6, chamfers 23A, 23B are created at the internal upper edges of the holder plates 22A, 22B. The chamfers 23A, 23B define a wider diameter portion at the inlet end of the magnet guide hole 33 such that the vertical cross section of the magnet guide hole 33 opens wider toward the top. During insertion of the permanent magnet 85 into the magnet guide hole 33, the permanent magnet 85 is aligned with the magnet guide hole 33 by being guided by the chamfers 23A, 23B.

As shown in FIG. 3, after the insertion of the sheets 80A, 80B into the slot 112, the pressing device 60 presses the permanent magnet 85 downward against the pinching force of the retaining plates 30A, 30B. The pressing device 60 includes a push plate 62 and an actuator 64. The push plate 62 has a cross section which is substantially the same as that of the permanent magnet 85 so as to enable the insertion of the permanent magnet 85 into the magnet guide hole 33.

The actuator 64 is disposed above the magnet guide hole 33 (refer to FIG. 2) to move the push plate 62 forward and backward (downward and upward) along the center axis C2 in the magnet guide hole 33.

A moving mechanism may be provided for the pressing device 60 to move, along the x-axis or the y-axis, the pressing device 60 aside from the center axis C2 to prevent the pressing device 60 from blocking a loading process of the permanent magnet 85 in the magnet guide hole 33.

The pair of retaining plates 30A, 30B are provided at the lower ends of the holder plates 22A, 22B. The retaining plates 30A, 30B extend lower than the lower ends of the holder plates 22A, 22B. More specifically, the retaining plates 30A, 30B extend downward and are tilted inwards toward the center axis C2 from the lower ends of the holder plates 22A, 22B.

As shown in FIG. 7, a gap between the lower ends of the pair of retaining plates 30A, 30B acts as the magnet outlet 35 through which the permanent magnet 85 is fed. As shown in FIGS. 4 and 7, the tilt angle and the length of the retaining plates 30A, 30B are determined such that the opening distance W2 of the magnet outlet 35 with no load applied to the retaining plates 30A, 30B is shorter than the thickness W1 of the permanent magnet 85. The retaining plates 30A, 30B are able to hold the permanent magnet 85 because the opening distance of the magnet outlet 35 is shorter than the thickness of the permanent magnet 85.

The retaining plates 30A, 30B may be metal strips made of, for example, aluminum, and function as spring plates. As described below, the pair of retaining plates 30A, 30B receives the permanent magnet 85 when the permanent magnet 85 is inserted into the magnet guide hole 33 and has descended. The retaining plates 30A, 30B exhibit sufficient elastic force to pinch (retain) the permanent magnet 85 in place against the weight of the permanent magnet 85.

Figure 8:
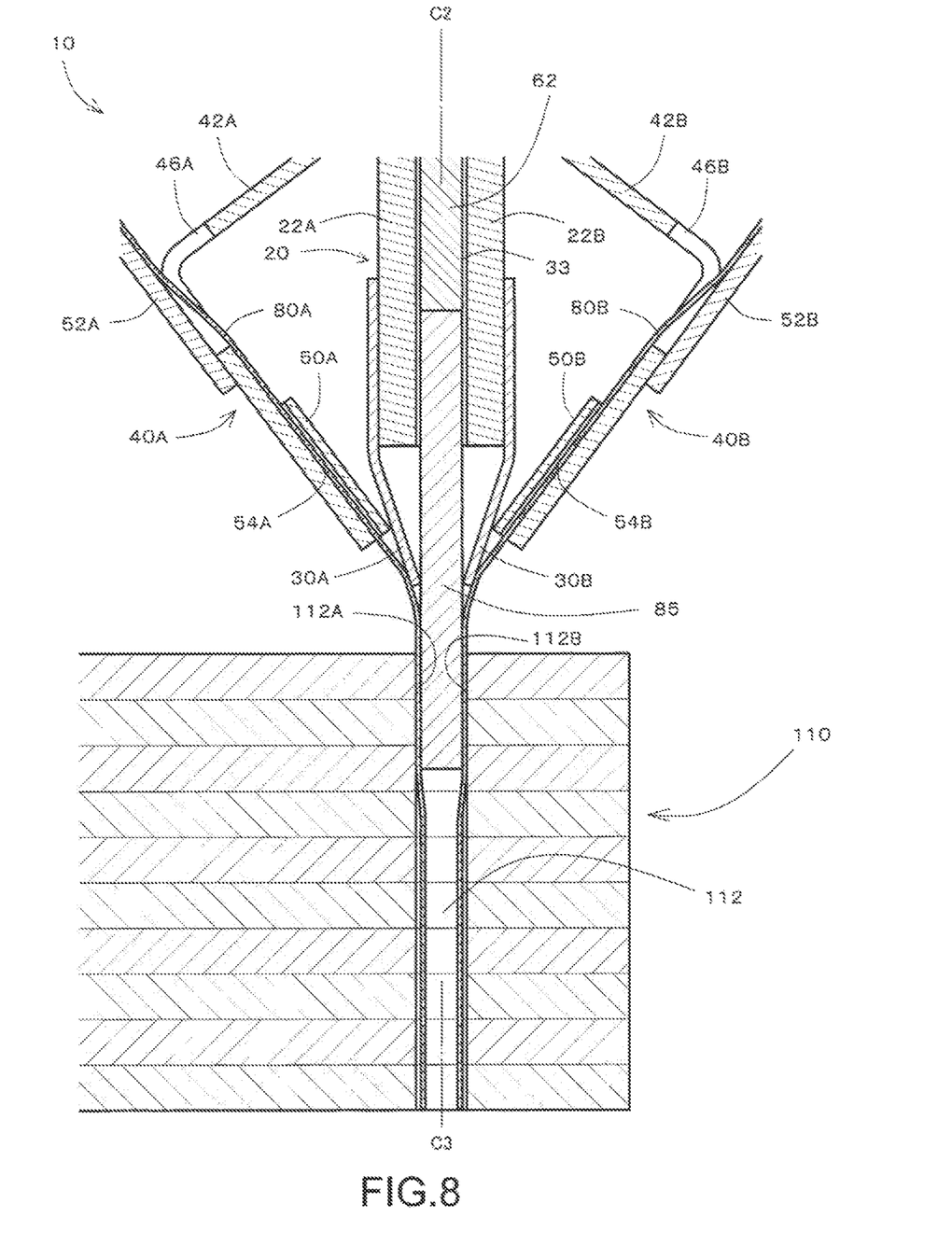
FIG. 8 is a front cross sectional view to be used to describe the insertion process of the sheets and the permanent magnet into the rotor core using the guide device (2/2).

As shown in FIG. 8, when the push plate 62 presses the permanent magnet 85 downward against the pinching force of the retaining plates 30A, 30B, the retaining plates 30A, 30B bend away from the center axis C2. The permanent magnet 85 then descends through the magnet outlet 35 (refer to FIG. 7) and is inserted into the slot 112 of the rotor core 110.

The retaining plates 30A, 30B are structured to have equal spring constants to enable centering of the permanent magnet 85 to align the permanent magnet 85 with the center axis C2 when the permanent magnet 85 is inserted into the slot 112. For example, the retaining plates 30A, 30B may have equal width and thickness. As shown in FIG. 4, the lengths of the portions of the retaining plates 30A, 30B that extend further from the holder plates 22A, 22B are equal to each other. It should be noted that these dimensions are deemed to be equal as long as any differences are within a certain tolerance.

Insertion Process of Sheet and Permanent Magnet

FIGS. 7 and 8 show an example process of insertion of the sheets 80A, 80B and the permanent magnet 85 into the slot 112 of the rotor core 110 using the guide device 10 according to an embodiment of the present disclosure.

In the insertion process, the sheets 80A, 80B and the permanent magnet 85 are inserted into the slot 112 with the rotor core 110 positioned to vertically orient the rotational axis C1 (refer to FIG. 1). The rotor core 110 is secured using a fixing plate (not shown).

The guide device 10 inserts the sheets 80A, 80B and the permanent magnet 85 into the slot 112 from above the rotor core 110. The guide device 10 is positioned to align the center axis C2 (refer to FIG. 2) of the magnet guide hole 33 with the center axis C3 of the slot 112 using a camera and/or other sensor mechanisms (not shown).

As described above, because the axis of symmetry of the sheet guides 40A, 40B and the center axis C2 of the magnet guide hole 33 are aligned with each other, the sheet guides 40A, 40B can be aligned with the slot 112 by aligning the magnet guide hole 33 with the slot 112. When the center axis C2 of the magnet guide hole 33 is aligned with the center axis C3 of the slot 112, the sheet guides 40A, 40B are positioned above the corresponding internal faces 112A, 112B of the slot 112.

After the positioning process described above, the sheets 80A, 80B are fed to the sheet guides 40A, 40B from rolls (not shown) by motors and/or other mechanisms (not shown). The permanent magnet 85 may be inserted into the magnet guide hole 33 by a robot or other means, or manually by a person. The permanent magnet 85 inserted into the magnet guide hole 33 is pinched by the retaining plates 30A, 30B in place such that the permanent magnet 85 does not descend further into the slot 112.

The sheets 80A, 80B are further fed into the slot 112 by motors and/or other mechanisms (not shown). When a sensor, such as a camera, senses that the lower edges of the sheets 80A, 80B have reached the bottom of the slot 112, the actuator 64 of the pressing device 60 (refer to FIG. 1) is activated to feed the push plate 62 downward.

When the push plate 62 which is fed downward touches the upper end of the permanent magnet 85, the push plate 62 further proceeds to press the push plate 62 downward as shown in FIG. 8. As a result, the retaining plates 30A, 30B bend away from the center axis C2 (the opening widened) as shown in FIG. 8. The retaining plates 30A, 30B presses the permanent magnet 85 from both sides using the restoring force. Such a pressing force from both sides (pinching) decreases the speed of descent of the permanent magnet 85 such that the permanent magnet 85 can descend with the push plate 62 at the descending speed of the push plate 62.

The permanent magnet 85 is positioned (centered) by the retaining plates 30A, 30B. As described above, because the spring constants of the retaining plates 30A, 30B are equal to each other, the center axis of the permanent magnet 85 is maintained at the center axis C2 of the magnet guide hole 33 and the magnet outlet 35 (refer to FIG. 6). This centering reduces misalignment of the permanent magnet 85 to the slot 112.

After the permanent magnet 85 is completely set in the slot 112, the portions of the sheets 80A, 80B extending out from the slot 112 are cut by a cutter (not shown). The guide device 10 then moves to an empty slot 112 without the sheets 80A, 80B and the permanent magnet 85.

The present disclosure is not limited to the present embodiments described above, and includes all changes and modifications without departing from the technical scope or the essence of the present disclosure defined by the claims.

The invention claimed is:

1. A rotor manufacturing device for inserting sheets and permanent magnets into slots extending along a rotational axis of a rotor core, each slot being an elongated hole and having a pair of internal faces opposing each other, the rotor manufacturing device comprising:
   a pair of sheet guides opposing each other, each of the sheet guides being disposed above a corresponding one of the pair of internal faces of the slot to feed the sheet into the slot, each of the sheet guides comprises an arm and a protection plate, and an upper face of the arm acts as a guide surface for feeding the sheet;
   a holder disposed between the pair of sheet guides, the holder comprising a magnet outlet through which the permanent magnet is fed into the slot from above; and
   a pair of retaining plates structured to pinch the permanent magnet in place against a weight of the permanent magnet is disposed at the magnet outlet;
   wherein the sheets and the permanent magnets are inserted with the rotor core positioned to vertically orient the rotational axis of the rotor core;
   the pair of sheet guides is linearly symmetrical in a front view in which a side of the pair of sheet guides is located at the front;

an axis of symmetry of the pair of sheet guides and a center axis of the magnet outlet are aligned with each other in the front view;

the retaining plates bend away from the axis of symmetry while the permanent magnet is inserted into the slot;

the arm extends diagonally downward toward the axis of symmetry; and the protection plate is spaced from the upper face of the arm so as to create a gap therebetween.

2. The rotor manufacturing device according to claim 1, wherein the retaining plates have equal spring constants.

3. The rotor manufacturing device according to claim 2, wherein the holder comprises a pressing device configured to press the permanent magnet downward against a pinching force of the pair of retaining plates after the sheets are inserted into the slot.

* * * * *